Sept. 28, 1965 H. F. BUSCHOW 3,208,776
TRANSITION COUPLINGS
Filed Sept. 6, 1960
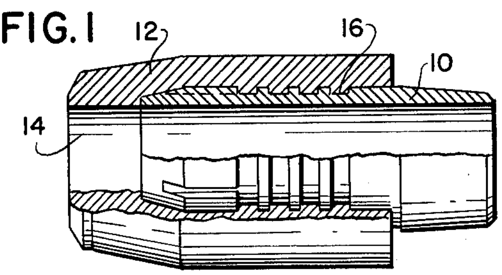
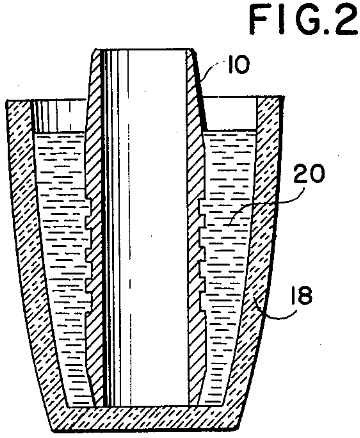
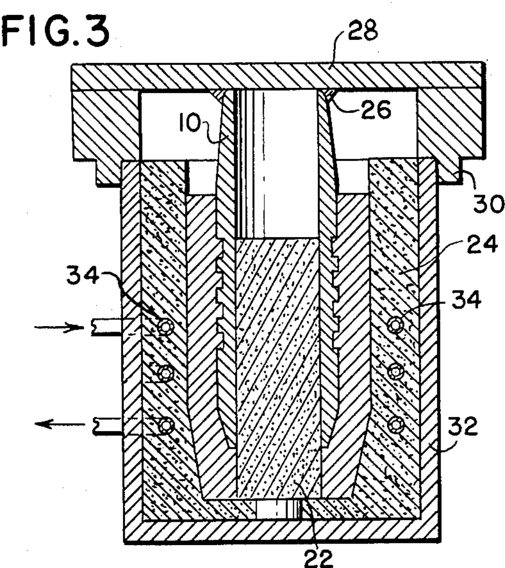
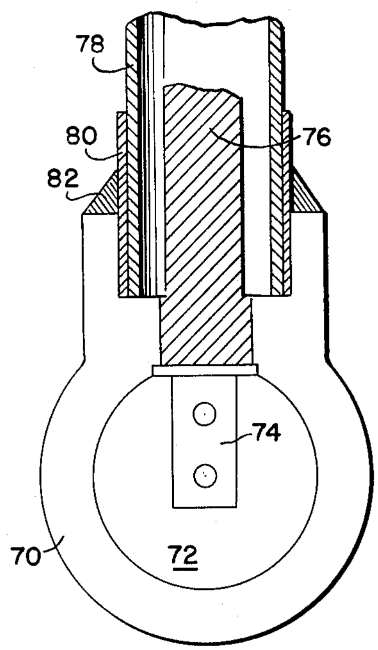
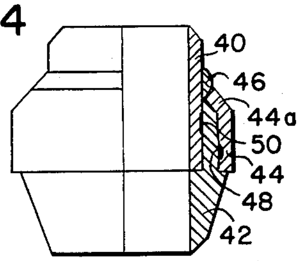
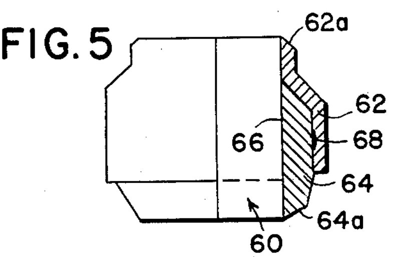
INVENTOR.
Herman F. Buschow
BY Nathaniel Ely
ATTORNEY.

United States Patent Office 3,208,776

Patented Sept. 28, 1965

3,208,776

TRANSITION COUPLINGS

Herman F. Buschow, Hillsdale, N.J., assignor to Hydrocarbon Research, Inc., New York, N.Y., a corporation of New Jersey Filed Sept. 6, 1960, Ser. No. 54,286
1 Claim. (Cl. 285—284)

The present invention relates to a transition coupling of the type shown in the U.S. Patent 2,787,481 of which I am one of the inventors. More particularly, the invention relates to a tubular coupling consisting of two dissimilar metallic nipples which permit field welding dissimilar pipes which are not normally weldable together.

It is known that aluminum and stainless steel or copper and stainless steel are not readily subject to welding in the field. Nevertheless, in cryogenic service stainless steel elements are often used as a heat dam to prevent heat flow from aluminum piping. There are many other opportunities for the use of interconnected piping of dissimilar materials and I have found that the use of short transition couplings which may be preassembled are suitable for field welding when they can be made adequately gas tight and of sufficient mechanical strength to take and transfer the normal longitudinal stress in a piping system. It is important that such a coupling should minimize maintenance due to temperature changes, and should be devoid of flanges which require complicated bolts, gaskets, and similar attaching means.

In the past, I have found that a mechanically shrunk coupling construction to be satisfactory as it can be made mechanically strong and gas tight for most purposes by the steps discussed in the above mentioned patent. I have found, however, that such constructions require considerable precision in the formation of the parts and careful temperature control to permit the necessary relative expansion and contraction for assembly. It does not lend itself to typical production line construction.

I am aware of prior efforts of casting aluminum on ferrous members primarily for the purpose of heat exchange and such practice generally includes a preliminary dipping of the ferrous parts in an aluminum bath. However, unless carefully controlled, the intermediate ferro-aluminum layer which is formed is brittle and mechanically weak. Such a construction can not be used safely in a piping system wherein any movement of the pipes adjacent to the coupling would tend to break the gas tight seal and is particularly objectionable in piping which is in cryogenic service.

It is the principal purpose of my invention to produce a coupling of the transition type for field welding of piping of dissimilar metals the parts of the coupling being formed into a unit which is gas tight and of such mechanical strength as to withstand the stresses of adjacent piping.

More particularly, my invention relates to an improved transition pipe or tubular coupling, particularly for high pressure and low temperature fluid service, which coupling is readily adapted to be welded into a piping system and is substantially stronger and more positive in sealing than prior available couplings of this type.

My invention also has for its object, an improved method of making transition couplings, particularly of copper or stainless steel and aluminum wherein the method steps reduce costs and improve the strength of the coupling.

Further objects and advantages of my invention will appear from the following description of a preferred form of embodiment thereof taken in connection with the attached drawing in which:

FIG. 1 is a central longitudinal cross section of one form of coupling.

FIG. 2 is a central vertical cross section through a fluxing bath.

FIG. 3 is a central vertical section through the mold.

FIG. 4 is an elevation, with parts in cross section, showing a modified form of coupling.

FIG. 5 is an elevational view, partly in section, of a still further modified form of coupling primarily for above zero degree Fahrenheit service.

FIG. 6 is a partial central section, with parts in elevation of a coupling for valve service.

The coupling shown in FIG. 1 is adapted for use in the field welding of dissimilar piping using as aluminum and stainless steel which is used in cryogenic service with temperatures as low as −423° F. and with pressures in the order of 450 p.s.i.g. where gas leakage is limited to two microns per cubic foot per hour. It consists of a stainless steel base nipple 10 to which is attached an aluminum nipple 12. For most effective processing operations, the stainless steel may be of the 18-8 type, and the aluminum is of a suitable alloy commonly designated as 3S by the Aluminum Company of America. Other alloys that can be used are 2S; 61; or 63.

The stainless steel nipple 10, and the aluminum nipple 12 will preferably have a smooth common bore generally indicated at 14. To increase the axial strength of the coupling as hereinafter described, the stainless steel nipple will also have one or more grooves or slots 16 which may conveniently be of the order of 5/16 of an inch in width, and about 0.03 inch deep.

I now find that it is preferable, in the interest of rapid production, as well as permanence of gas sealing, to form the lighter aluminum or aluminum alloy outer nipple 12 around the higher density steel inner nipple 10 as by casting operation as hereinafter described as such practice establishes a seal which is tight not only at all normal atmospheric temperatures, but improves in cryogenic service.

This construction of the coupling shown in FIG. 1 is accomplished by at least six principal steps as follows:

(1) Clean the high density nipple to remove oil and dirt.

(2) Pre heat the high density (inner) nipple to about 500–600° F.

(3) Flux the high density (inner) nipple to remove oxides and to pre heat it nearly to the aluminum melting point.

(4) Pour molten light aluminum or aluminum alloy metal into mold.

(5) Insert high density nipple in mold.

(6) Cool assembly promptly.

As to step one, I have found that stainless steel nipples, particularly after storage, frequently have oil films or dirt which must be removed to permit an aluminum contact. I, therefore, normally clean the steel nipple with the usual degreasing techniques and I may take a shallow or bright cut without necessarily removing the tool marks. This serves as a standard condition for the preliminary treatment of the nipple.

As a second step I find it desirable to preheat the nipple to about 500–166° F. as by induction heating coil or other means not shown. It is important that this preheating not exceed about 600° F. and in any event must be below 800° F. in air to prevent a reoxidation of the metal surface.

As a third step in th eprocess the nipple 10 is injected into a flux 20 in the cruible 18. The flux used for stainless steel is primarily a fluoride composition which I find is particularly effective in removing oxides such as chromic oxide. Preferably, the flux is maintained at about 1000° F. by heating the container 18 to a somewhat higher temperature. The steel nipple 10 is preferably moved up and down in the flux bath 20 after the nipple has substantially reached such temperature. It has been found that when the nipple is initially placed in the flux some solidification of the flux takes place forming a skin in the nature of a crud, and that when this crud redisolves in the flux, the nipple has reached the desired preheating temperature. Depending on the size of the couplings, this may take several minutes or more.

As the fourth step in my processing, the molten light metal is next poured into the mold 24 which may be heated by well known means. Usually the temperature of the melt is around 1400–1450° F. which is about two hundred degrees higher than the melting point. The stainless steel nipple 10 with some flux coating on its outer side is then inserted into the melt and placed over a plug 22 in the sand mold 24 primarily to assure a uniform clearance with the inner walls of the mold and to diminish the amount of aluminum which would penetrate the interior of the nipple 10. It is, of course, entirely appropriate to coat the internal bore 14 of the nipple 10 as with graphite to prevent aluminum adhering to the internal surfaces.

Conveniently the nipple 19 may be tack welded as at 26 or clamped to the mold cover 28 for centering over the core plug 22. The mold cover 28 may be provided with guides 30 to engage the outer side of the mold box 32.

As a final step in my processing the aluminum is promptly cooled by the contact with the colder ferrous element not only to cause an immediate shrinkage of the aluminum against the internal nipple and its slots but to reduce migration of aluminum and iron molecules which would otherwise form an objectionable alloy layer.

While some bone may result, it is incidental and is to be minimized as much as possible. On large couplings for example I may utilize internal cooling coils 34 in the sand mold through which a suitable coolant can be circulated. Normally, however, I find it sufficient to promptly withdraw the stainless steel nipple 10 and its attached aluminum nipple from the mold 12 for air cooling.

A coupling of this type may then be suitably machined as indicated in FIG. 1 by providing suitable welding scarfs as is well known in the industry.

I find that a coupling of this type is not only unusually gas tight and corrosion free with a very low gas permeability at very low temperatures but will withstand considerable shock treatment as evidenced by tests of repeated heating and sudden cooling. It also withstands shear and has a mechanical strength as great or or greater than the piping to which it is attached.

It will, of course, be appreciated that with the higher co-efficient of expansion of aluminum with respect to stainless steel, and the ratio of these materials is nearly two to one, there is an inherent shrinkage as the temperature drops below the initial casting temperature of 1400° F. Furthermore, as the normal operating temperature for such couplings may be several hundred degrees below 0° F. the compression tends to increase and further protect the seal.

There are occasions when coupling of this type are also desirable for operating temperatures which may reach a super atmospheric condition for example as high as about 400° F. In such case I prefer to utilize the coupling more particularly shown in FIG. 4 which includes not only the stainless steel nipple 40 and the aluminum nipple 42 which has been poured over the stainless steel nipple in substantially the same manner as in FIGS. 1 to 3, but also to use a surrounding steel sleeve 44. This may be of truncated shape as at 44*a* and is conveniently welded to the nipple 40 as by the weld 46. It may also be integral with the stainless steel nipple 40.

In this construction it is convenient to insert the element 40 after fluxing, into the aluminum which will flow into the pocket between the inner sleeve 40 and the outer sleeve 44 for permanent bonding of the aluminum thereto.

In this construction, it may be found desirable also to have one or more grooves 48 on the exterior 44 of the nipple and a similar groove 50 on the interior of the sleeve 40. The extra reinforcement in such a construction makes it possible to have a much shorter coupling for the same operating temperatures and pressures.

If a coupling were only used for eleveated temperatures of above zero degrees F. as for example in steam service (up to about 400° F.) the inner sleeve would not be needed. Such a construction is shown in FIG. 5 wherein the coupling generally shown at 60 has a stainless steel outer nipple portion 62 and an inner aluminum nipple portion 64 which is surrounded by the outer portion 62. In such case, as in the previously described forms, the central bore 66 is smooth and common to both nipple portions. Furthermore, each nipple portion 62 and 64 will normally have the suitably formed end portions 62*a* and 64*a* respectively to permit securing, by welding, of adjacent pipe members. A shear rib 68 may be used if longitudinal shear becomes a problem of reenforcement.

In FIG. 6, I have shown a modified form of coupling which has the characteristics of a pipe but which has no fluid flow through it. In this construction, a valve body 70 of aluminum will have a butterfly valve element 72 mounted on stem 74 which in turn is a part of valve rod 76. This rod, conveniently of stainless steel, is intended to be operated from a remote point to which cold should not flow. A shield or tube 78, also of stainless steel, similarly extends coextensively with the valve rod 76. Usually such shield serves to permit the formation of insulation around the valve without interfering with its operation.

To conveniently secure the stainless steel shield to the aluminum valve body 70, I form a coupling comprising a cast outer nipple or sleeve of aluminum shown at 80 on the valve shield. Thereafter it is a relatively simple field welding matter to weld the two adjacent aluminum pieces (80 and the valve body 70 as at 82). Such a construction becomes a complete barrier to cold flow and renders field assembly entirely simple and convenient.

While stainless steel-aluminum couplings are in great demand, I also find it possible to use a copper base element instead of the stainless steel. In such case, the time of cooling of the aluminum is somewhat less than with the stainless steel. A different flux will also be used.

In view of the various modifications of the invention which will occur to those skilled in the art, upon consideration of the foregone disclosures without departing from the spirit of scope they are of only such limitations and should be imposed as are indicated by the appended claim.

I claim:

A transition coupling for use in heat transfer systems comprising a telescoped pair of cylindrical nipples, the outer nipple and the inner nipple being formed, respectively, of low density aluminum having a high coefficient of heat transfer and a high density stainless steel having a low coefficient of heat transfer, said aluminum nipple being molded around the stainless steel nipple, said nipples extending axially beyond the telescoped portions thereof in opposite directions to form connecting portions adapted to be welded to portions of similar metals whereby the stresses of said member are transferred through said coupling, the wall thickness of the low density nipple being substantially greater than the wall thickness of the high density nipple and a chemical bond uniting said nipples at their interface, said bond being occasioned by the migration of iron from the stainless steel into the aluminum forming an iron-aluminum alloy, said alloy being radially microscopically thin and penetrating into the aluminum by radially decreasing amounts providing a cohesion between said nipples having a relatively low brittleness factor and serving as a gas seal.

References Cited by the Examiner

UNITED STATES PATENTS

| | | | |
|---|---|---|---|
| 971,136 | 9/10 | Monnot | 22—204 X |
| 1,359,719 | 11/20 | Mead | 22—203 |
| 1,682,590 | 8/28 | Austin | 22—203 |
| 1,715,507 | 6/29 | Kyle | 22—203 |
| 1,776,615 | 9/30 | Boothman | 285—329 |
| 1,977,432 | 10/34 | Dick | 285—331 |
| 2,142,357 | 1/39 | Jacobson | 285—287 |
| 2,543,936 | 3/51 | Reynolds | 22—204 X |
| 2,552,117 | 5/51 | Roswell | 251—308 |
| 2,586,927 | 2/52 | Frantz | 251—308 |
| 2,611,163 | 9/52 | Schaefer et al. | 22—203 X |
| 2,787,481 | 4/57 | Buschow | 285—329 |
| 2,823,933 | 2/58 | Hickman | 285—173 |
| 2,903,763 | 9/59 | Grenell | 285—291 |
| 2,949,319 | 8/60 | Hutchins | 285—173 |
| 3,096,566 | 7/63 | Jepson | 29—257 |

FOREIGN PATENTS

| | | |
|---|---|---|
| 570,579 | 2/59 | Canada. |

CARL W. TOMLIN, *Primary Examiner.*

THOMAS F. CALLAGHAN, *Examiner.*